(No Model.)
J. C. KITTON.
PIPE JOINT AND COUPLING.
No. 302,343. Patented July 22, 1884.
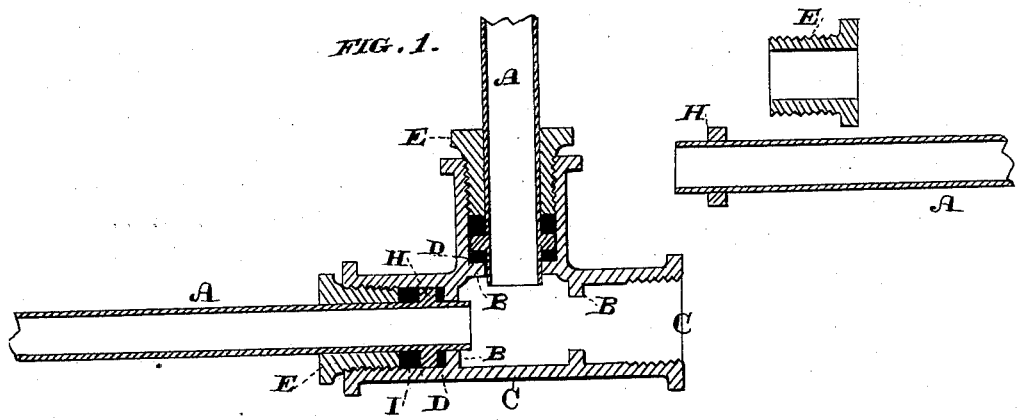
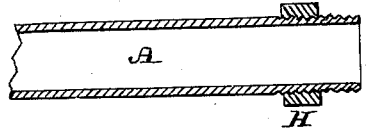
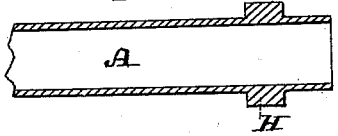
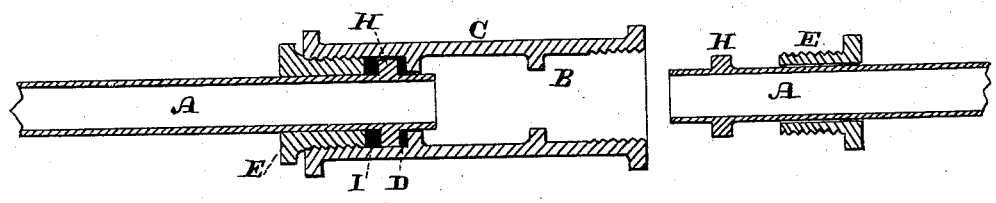
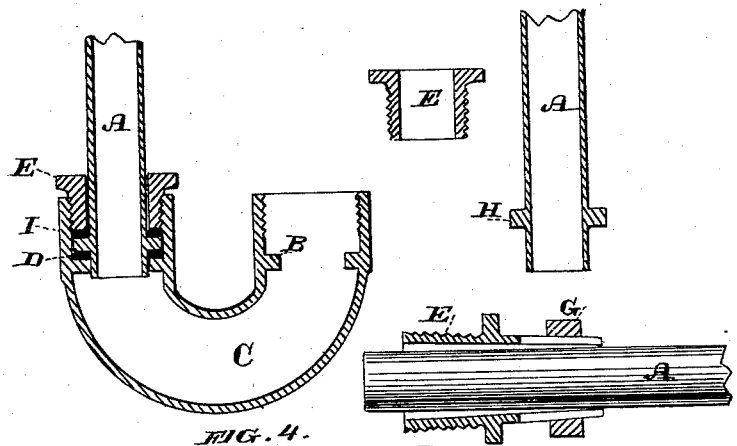
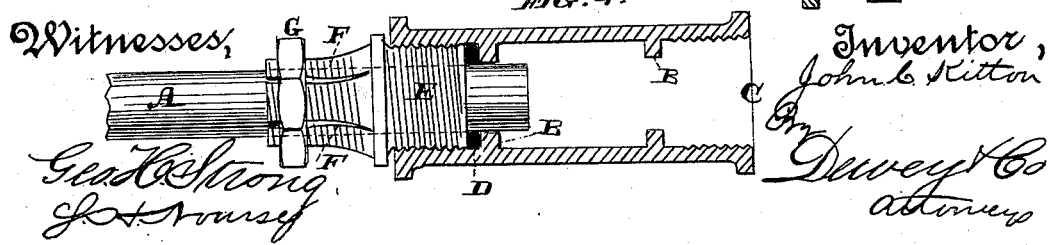
Witnesses,
Geo. H. Strong
J. H. Toursey
Inventor,
John C. Kitton
By Dewey & Co
Attorneys

United States Patent Office.

JOHN C. KITTON, OF SAN FRANCISCO, CALIFORNIA, ASSIGNOR OF ONE-HALF TO J. O. B. GUNN, OF SAME PLACE.

PIPE-JOINT AND COUPLING.

SPECIFICATION forming part of Letters Patent No. 302,343, dated July 22, 1884.

Application filed January 7, 1884. (No model.)

*To all whom it may concern:*

Be it known that I, JOHN C. KITTON, of the city and county of San Francisco, and State of California, have invented an Improvement in Pipe-Joints and Couplings; and I hereby declare the following to be a full, clear, and exact description thereof.

My invention relates to a pipe-joint and coupling which is especially useful where gases or vapors are to be conveyed under pressure.

It consists of a coupling-sleeve having screw-threads cut at one or both ends, and a permanent collar or collars formed within the sleeve just inside the screw-threads. The coupling-pipes extend into these collars, which they just fit, without screw-threads, and are secured by glands or followers which surround the pipes and screw into the sleeves.

The pipes may have a collar and packing, against which the gland presses to hold them and make a tight joint, or the outer end of the gland may be conical, split, and threaded to receive a nut which closes it, so as to clamp and hold the pipe.

Referring to the accompanying drawings for a more complete explanation of my invention, Figure 1 is a view of a T-coupling sleeve with two pipes connected with it. Fig. 2 is a straight coupling end with a pipe secured in one end and the opposite pipe detached. Fig. 3 is a similar view of a U-coupling. Fig. 4 is a view of a straight coupling with the pipe held and packed by a clamping nut and gland. Fig. 5 shows the pipe with the collar screwed onto it. Fig. 6 shows the collar formed solidly upon the pipe.

In coupling-pipes to be used in ice-machines, and in other similar places where gas or vapor is passed through them under high pressure, it has been customary to cut a thread upon the exterior of the pipe end, and to screw it into a coupling-nut, with means for packing the joint steam or gas tight. This plan is open to the objection that the pipe is much weakened by cutting the screw-thread, and is liable to be ruptured at that point. In my invention the ends of the pipe A are left straight and plain, and are simply pushed through collars B, which they fit pretty closely. These collars are fixed within the coupling-sleeve C, of which they form a part, and rubber or other washers D are fitted upon them, and the glands E, surrounding the pipes, are screwed down upon them, thus making a tight joint.

In order to hold the pipes firmly in place in the coupling, the gland E has screw-threads cut upon its exterior, and fits into similar threads cut inside the end of the coupling. In Fig. 4 I have shown the outer end of this gland extended in a tapering form and having slits F cut longitudinally in it. Screw-threads are cut upon its exterior surface, and a nut, G, is fitted to turn upon it, thus compressing the sections made by the slits, so that they clamp the pipe tightly, and thus hold it in place.

In Figs. 1, 2, and 3 I have shown a collar, H, screwed or formed upon the end of the pipe. This collar slips into the end of the coupling and rests upon the washer D, and another washer, I, is slipped over the pipe against the collar. The gland E is then screwed down upon the collar and washers, and holds the whole rigidly in place, making at the same time a tight joint.

As no threads are cut in the pipes A, they always retain their full strength, and they may be held in place as firmly as necessary without in any way weakening them. They are easily removed, any section being taken out by simply loosening the clamp-nut, Fig. 4, and slipping the pipe along until its end is free from the coupling.

Having thus described my invention, what I claim as new, and desire to secure by Letters Patent, is—

1. In a coupling for pipes, a sleeve having screw-threads cut inside its ends and collars fixed within it, through which the plain ends of the pipes A may be inserted, and upon which washers or packing may be placed, on each side of a collar formed on said pipes, in combination with a gland surrounding the pipe, and screwing into the end of the coupling, substantially as herein described.

2. In a coupling for pipes, a sleeve with its interior screw-threaded at the ends, and having smooth interior collars, as shown, in combination with pipes fitting said collars, and having collars secured to themselves, with washers upon either side, and glands surrounding the pipe and screwing into the sleeve, substantially as herein described.

In witness whereof I have hereunto set my hand.

JOHN C. KITTON.

Witnesses:
S. H. NOURSE,
H. C. LEE.